United States Patent
Fang

(10) Patent No.: US 9,228,601 B2
(45) Date of Patent: Jan. 5, 2016

(54) FASTENING ASSEMBLY AND WALKER COMPRISING THE SAME

(71) Applicant: SUPER POWER INDUSTRIES CO, LTD., Baise, Guangxi (CN)

(72) Inventor: Yu-Chun Fang, Taipei (TW)

(73) Assignee: SUPER POWER INDUSTRIES CO., LTD., Baise (CN)

( * ) Notice: Subject to any disclaimer, the term of this patent is extended or adjusted under 35 U.S.C. 154(b) by 57 days.

(21) Appl. No.: 14/187,013

(22) Filed: Feb. 21, 2014

(65) Prior Publication Data
US 2015/0240849 A1    Aug. 27, 2015

(51) Int. Cl.
*A61H 3/00*  (2006.01)
*F16B 7/04*  (2006.01)

(52) U.S. Cl.
CPC  *F16B 7/042* (2013.01); *A61H 3/00* (2013.01); *Y10T 24/44538* (2015.01)

(58) Field of Classification Search
CPC ... A61H 3/00; A61H 3/04; A61H 2201/0161; Y10T 403/59; Y10T 29/49826; Y10T 403/00; Y10T 24/4458; F16B 7/042
USPC ...................... 135/65, 67, 69, 74; 482/66–68; 280/510, 230.4, 230.6, 230.7, 227.4, 280/228.4; 403/302, 308, 309, 321, 330
See application file for complete search history.

(56) References Cited

U.S. PATENT DOCUMENTS

| | | | | |
|---|---|---|---|---|
| 4,647,241 A * | 3/1987 | Weber | | 403/18 |
| 4,729,395 A * | 3/1988 | Adamson | | 135/67 |
| 5,188,139 A * | 2/1993 | Garelick | | 135/67 |
| 5,275,187 A * | 1/1994 | Davis | | 135/67 |
| 5,305,978 A * | 4/1994 | Current | | 248/230.4 |
| 7,373,942 B1* | 5/2008 | Yeager | | 135/67 |
| 7,926,834 B2* | 4/2011 | Willis | | 280/650 |
| 2004/0020525 A1* | 2/2004 | Lev | | 135/66 |
| 2009/0044380 A1* | 2/2009 | Moore et al. | | 16/421 |
| 2014/0109943 A1* | 4/2014 | Fang | | 135/67 |
| 2014/0216510 A1* | 8/2014 | Pronzati et al. | | 135/74 |
| 2015/0093182 A1* | 4/2015 | Wu | | 403/109.6 |

\* cited by examiner

*Primary Examiner* — Winnie Yip
(74) *Attorney, Agent, or Firm* — Ming Chow; Sinorica, LLC

(57) ABSTRACT

The present invention provides a walker including a fastening assembly. The walker has a connection part including two brace units, the fastening assembly assembled with the two brace units, and two side frames mounted to the connection part. The fastening assembly has a first baffle having a pivot end, a second baffle having a clasping portion, a curved wall having at least one plug and connecting the first baffle and the second baffle, and a clasping component pivotally mounted to the pivot end and selectively engaged with the clasping portion. The at least one plug of the fastening assembly is inserted into and fixed by the two brace units; and the clasping component is engaged with the clasping portion for further enhancing stability of the connection part and the fastening assembly to prevent the fastening assembly from falling off.

6 Claims, 7 Drawing Sheets

FASTENING ASSEMBLY AND WALKER COMPRISING THE SAME

BACKGROUND OF THE INVENTION

1. Field of the Invention

The present invention relates to a fastening assembly, especially to a fastening assembly with a clasping structure; the present invention also relates to a walker, especially to a walker with said fastening assembly.

2. Description of the Prior Art(s)

People in need of mobility aids, such as the elder or patients with injured lower limbs, often use a walker to assist with walking. However, a conventional walker does not have any folding feature and is inconvenient for storage.

With reference to FIG. 7, a conventional walker 9 comprises a connection part 70, a fastening assembly 80, and two side frames 90.

The connection part 70 comprises two brace units 71, an inner face, and an outer face. Each brace unit 71 comprises a joint portion 711 and a mounting portion 712. The joint portions 711 are used for connecting the two brace units 71. Each mounting portion 712 is mounted on each side frame 90 respectively. The inner face of the connection part 70 faces a user of the walker. The outer face is opposite to the inner face.

The fastening assembly 80 comprises a fixed member 80 and a stick 82. The fixed member 81 comprises an internal face, two clamping ends 811, and an insertion opening 812. The insertion opening 812 is formed between the two clamping ends 811. The stick 82 is formed from the internal face and extends to the insertion opening 812.

The stick 82 of the fastening assembly 80 is transversely inserted into the joint portions 711 of the two brace units 71 from the outer face of the connection part 70 and clamps the connection part 70 by the two clamping ends 811.

Although the conventional walker 9 can easily be disassembled for storage, the fastening assembly 80 of the conventional walker 9 does not have any other fixing member between the two clamping ends 811 after being assembled to the connection part 70. Hence the fastening assembly 80 may fall off when the user inadvertently touches the fastening assembly 80 and the two brace units 71 will separate from each other. It may make the user lose support from the conventional walker 9 and fall.

To overcome the shortcomings, the present invention provides a fastening assembly and a walker comprising the fastening assembly to mitigate or obviate the aforementioned problems.

SUMMARY OF THE INVENTION

The present invention provides a walker including a fastening assembly. The walker comprises a connection part including two brace units, the fastening assembly assembled with the two brace units, and two side frames mounted to the connection part.

The fastening assembly comprises a first baffle having a pivot end, a second baffle having a clasping portion, a curved wall having at least one plug and connecting the first baffle and the second baffle, and a clasping component pivotally mounted to the pivot end and selectively engaged with the clasping portion.

The at least one plug of the fastening assembly is inserted into and is fixed by the two brace units; and the clasping component is engaged with the clasping portion for further enhancing stability of the connection part and the fastening assembly to prevent the fastening assembly from falling off upon force.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
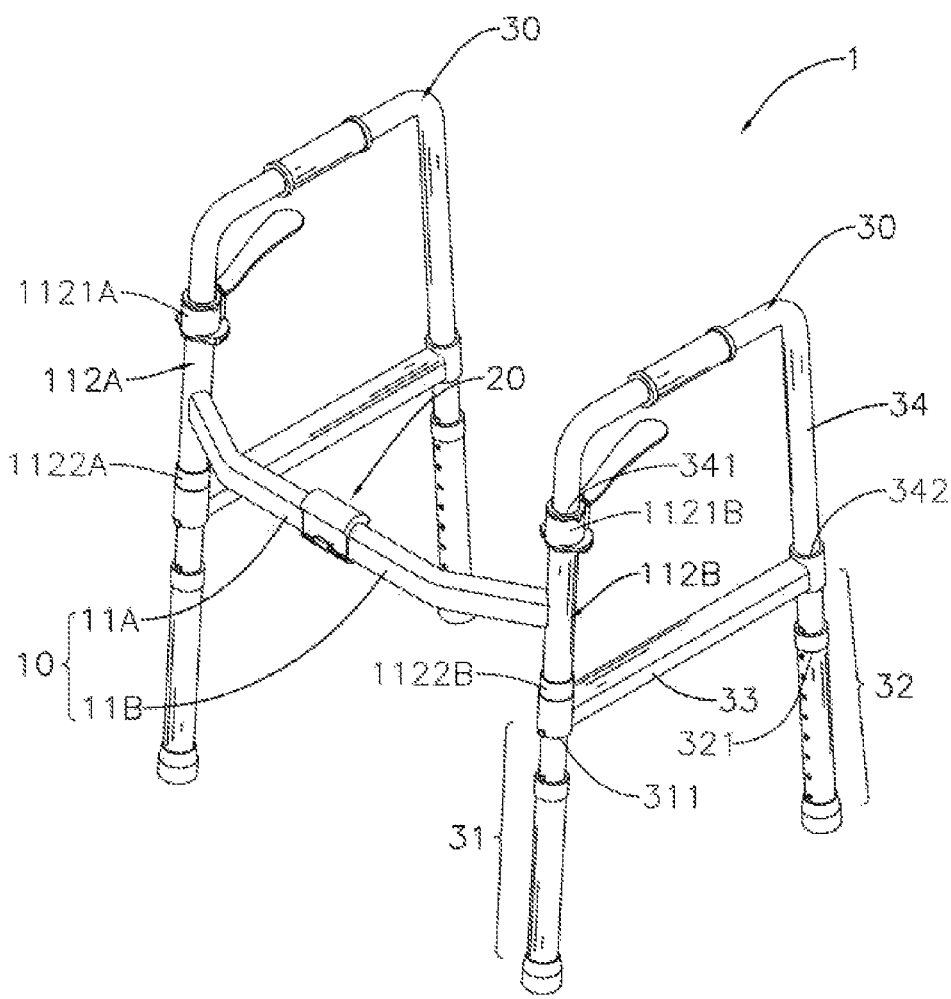
FIG. 1 is a perspective view of a walker in accordance with the present invention.
Figure 2:
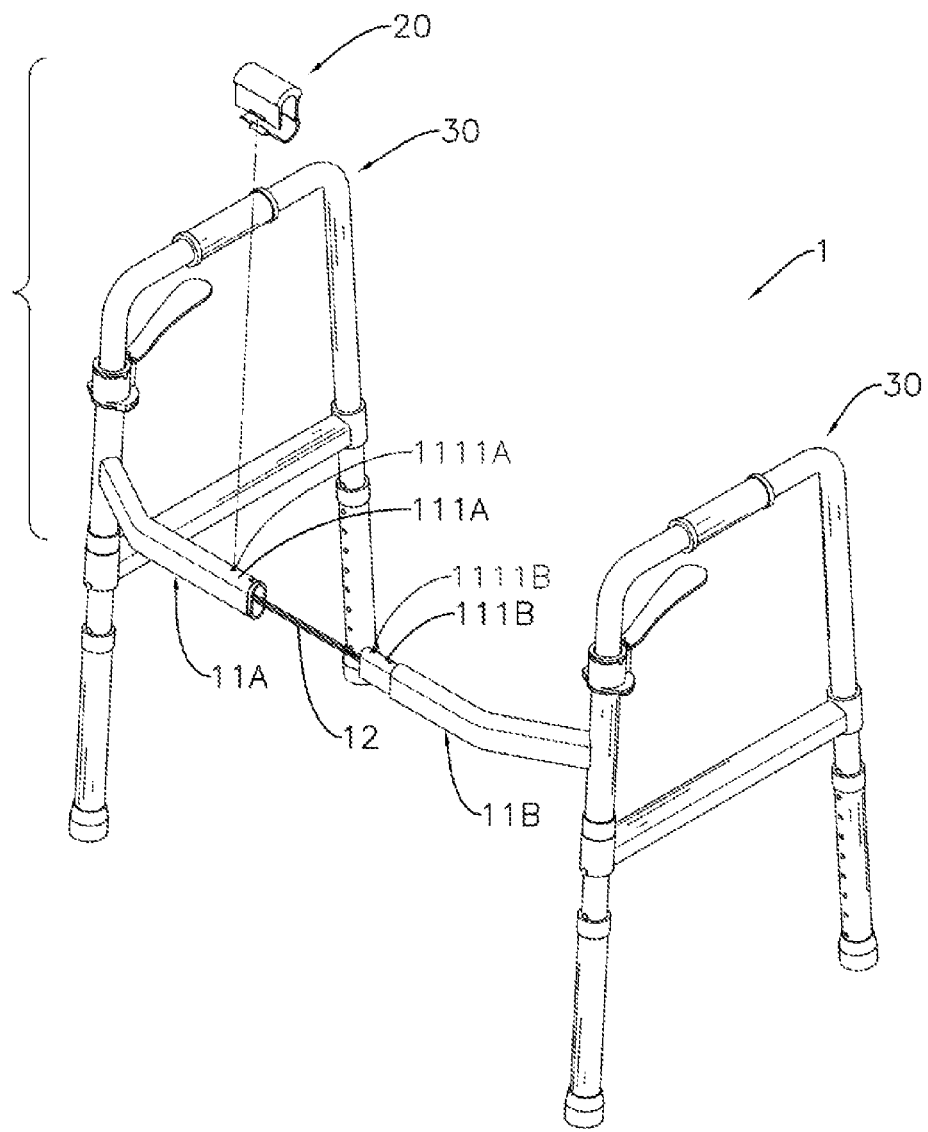
FIG. 2 is an exploded perspective view of the walker in FIG. 1.

With reference to FIG. 1 and FIG. 2, a walker 1 in accordance with the present invention comprises a connection part 10, a fastening assembly 20, and two side frames 30.

The connection part 10 comprises two brace units 11A, 11B; each brace unit 11A, 11B is hollow and includes a joint portion 111A, 111B and a mounting portion 112A, 112B. A cross-sectional area of one of the joint portions 111A of the two brace units 11A, 11B is larger than a cross-sectional area of the other joint portion 111B. Said one of the joint portions 111A of the two brace units 11A, 11B is mounted on the other joint portion 111B. Each joint portion 111A, 111B comprises two aligning holes 1111A, 1111B and the aligning holes 1111A, 1111B are formed on a top surface of each joint portion 111A, 111B. Each mounting portion 112A, 112B of the two brace units 11A, 11B has an upper end 1121A, 1121B and a lower end 1122A, 1122B. Specifically, the joint portions 111A, 111B of the two brace units 11A, 11B are flat. More specifically, the connection part 10 further comprises an elastic rope 12 including two ends; the two ends of the elastic rope 12 are respectively mounted into and connect to the two brace units 11A, 11B.

Figure 3:
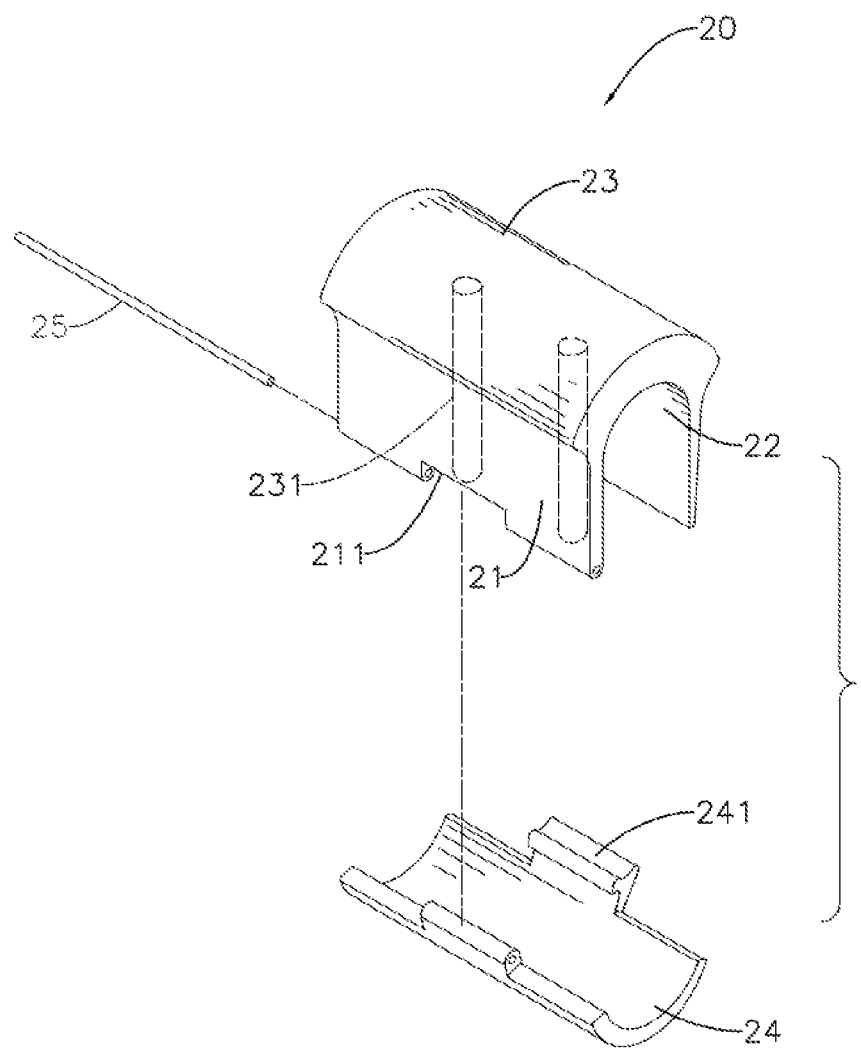
FIG. 3 is an exploded perspective view of a fastening assembly of the walker in FIG. 1.
Figure 4:
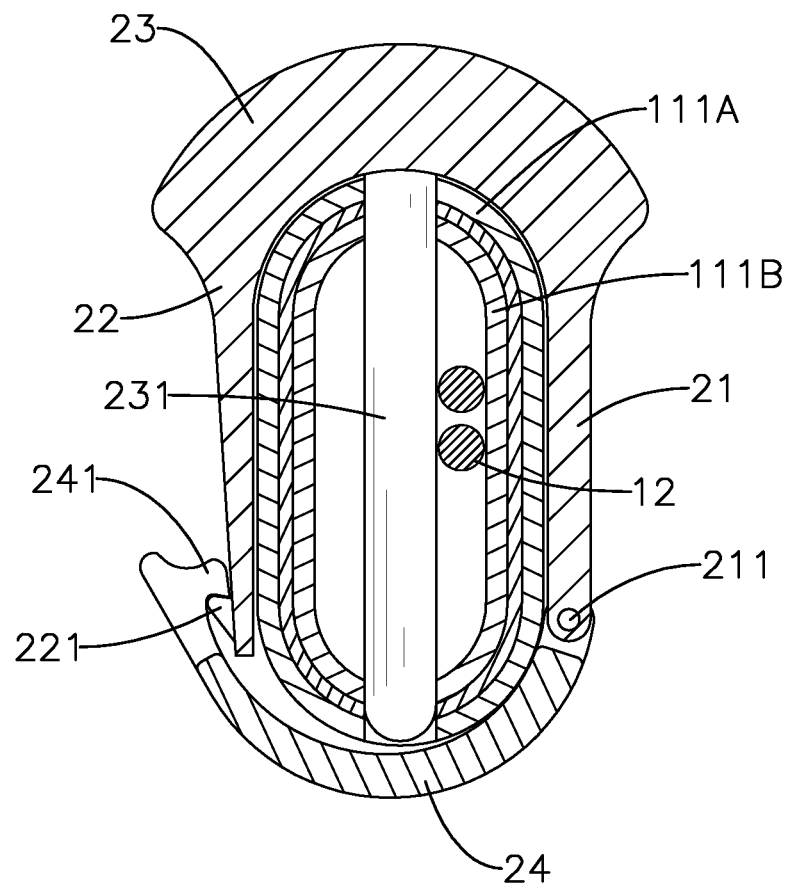
FIG. 4 is a side view in partial section of the walker in FIG. 1.

With reference to FIG. 3 and FIG. 4, the fastening assembly 20 comprises a first baffle 21, a second baffle 22, a curved wall 23, and a clasping component 24. The first baffle 21 has a pivot end 211. The first baffle 21 and the second baffle 22 are parallel to each other. The second baffle 22 has an external sidewall and a clasping portion 221. The external sidewall of the second baffle 22 is opposite to the first baffle 21. The clasping portion 221 is formed on the external sidewall. The curved wall 23 comprises an internal face, two ends, and at least one plug 231. The two ends of the curved wall 23 are respectively connected to the first baffle 21 and the second baffle 22. The at least one plug 231 of the curved wall 23 is formed on the internal face of the curved wall 23 and is located between the first baffle 21 and the second baffle 22. The at least one plug 231 is parallel to the first baffle 21 and the second baffle 22. The clasping component 24 is pivotally connected to the pivot end 211 of the first baffle 21 by a hinge pin 25 and includes a clasping structure 241 selectively engaging with the clasping portion 221 of the second baffle 22. Specifically, a distance between the first baffle 21 and the second baffle 22 is smaller than a width of the first baffle 21 or a width of the second baffle 22. More specifically, the clasping portion 221 of the second baffle 22 is a bump and the clasping structure 241 of the clasping component 24 is a hook.

The at least one plug 231 of the fastening assembly 20 is longitudinally inserted into the aligning holes 1111A, 1111B of the joint portions 111A, 111B of the two brace units 11A, 11B. The curved wall 23 of the fastening assembly 20 is attached to the top surface of one of the joint portions 111A. The clasping component 24 is selectively attached to a bottom surface of said one of the joint portions 111A; and the clasping structure 241 of the clasping component 24 is selectively engaged with the clasping portion 221 of the second baffle 22. Specifically, said one of the joint portions 111A comprises an inner surface and an outer surface. The inner surface of said one of the joint portions 111A faces the user. The second baffle 22 is attached to the outer surface of said one of the joint portions 111A.

The two side frames 30 are respectively mounted to the mounting portions 112A, 112B of the two brace units 11A, 11B. Each side frame 30 comprises a front leg 31, a back leg 32, a connecting member 33, and a U-shaped frame 34. A top end 311 of the front leg 31 is pivotally mounted to the lower end of the mounting portions 112A, 112B of a corresponding one of the two brace units 11A, 11B. The back legs 32 are disposed opposite to the front legs 31; and the back leg 32 has a top end 321. The connecting member 33 is joined to the front leg 31 and the back leg 32. The U-shaped frame 34 comprises a front end 341 and a back end 342. The front end 341 of the U-shaped frame 34 is pivotally mounted to the upper end of the mounting portions 112A, 112B of said corresponding one of the two brace units 11A, 11B. The back end of the U-shaped frame 34 is mounted to the top end of the back leg 32.

Figure 5:
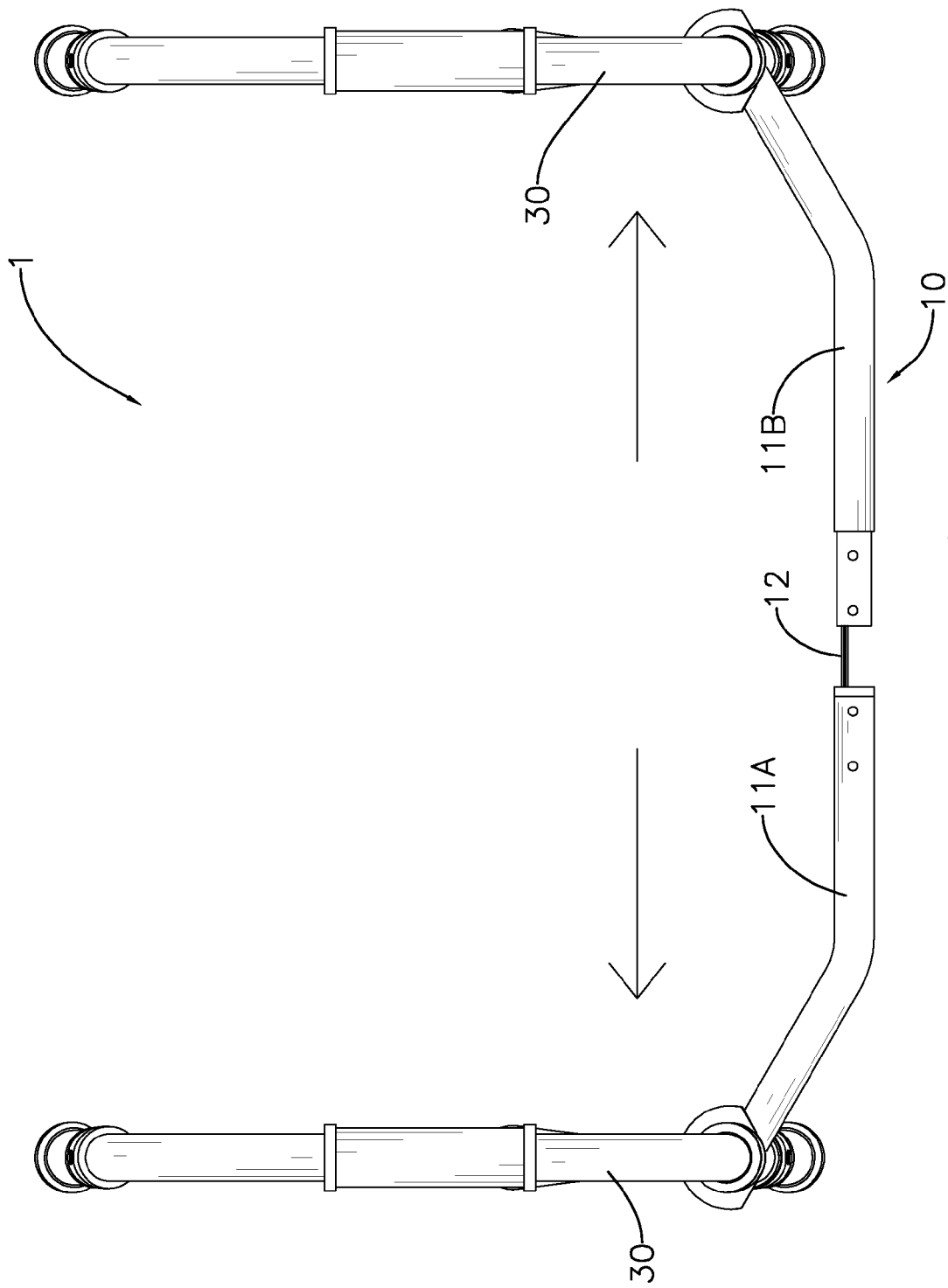
FIG. 5 is an operational view of the walker in FIG. 1 in a folded status.
Figure 6:
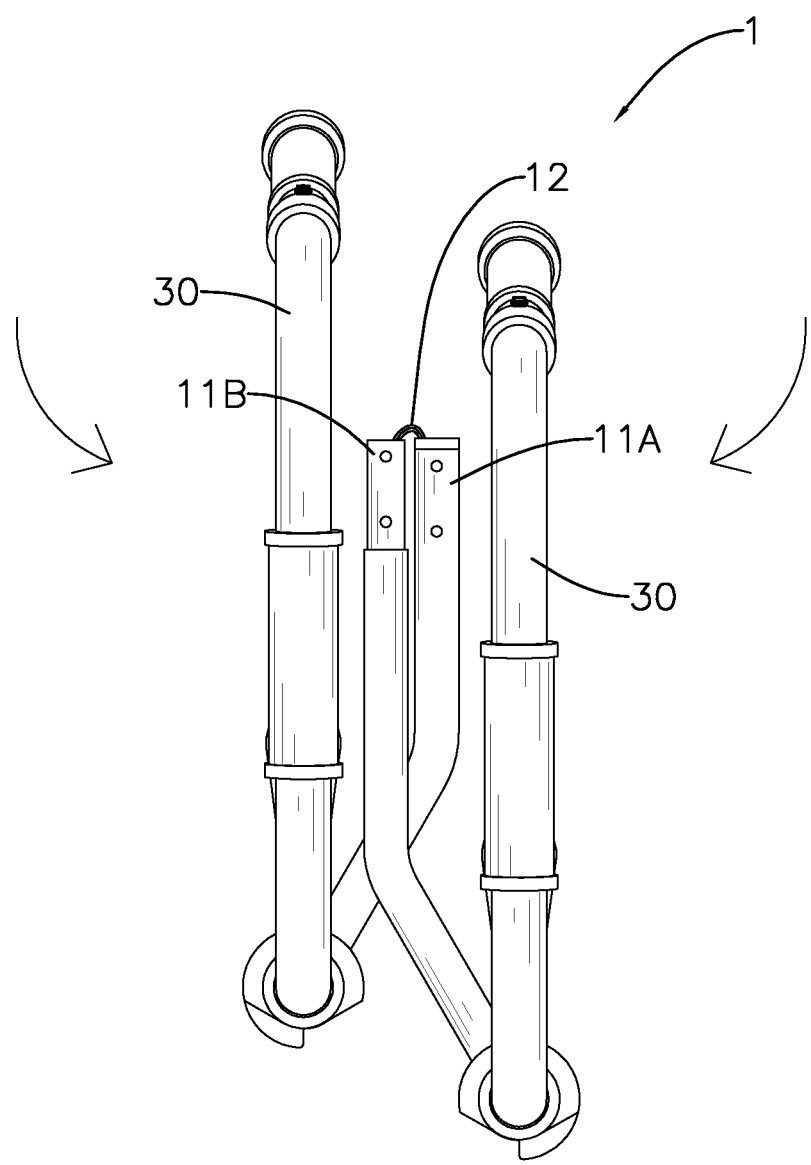
FIG. 6 is another operational view of the walker in FIG. 1 in a folded status.
Figure 7:
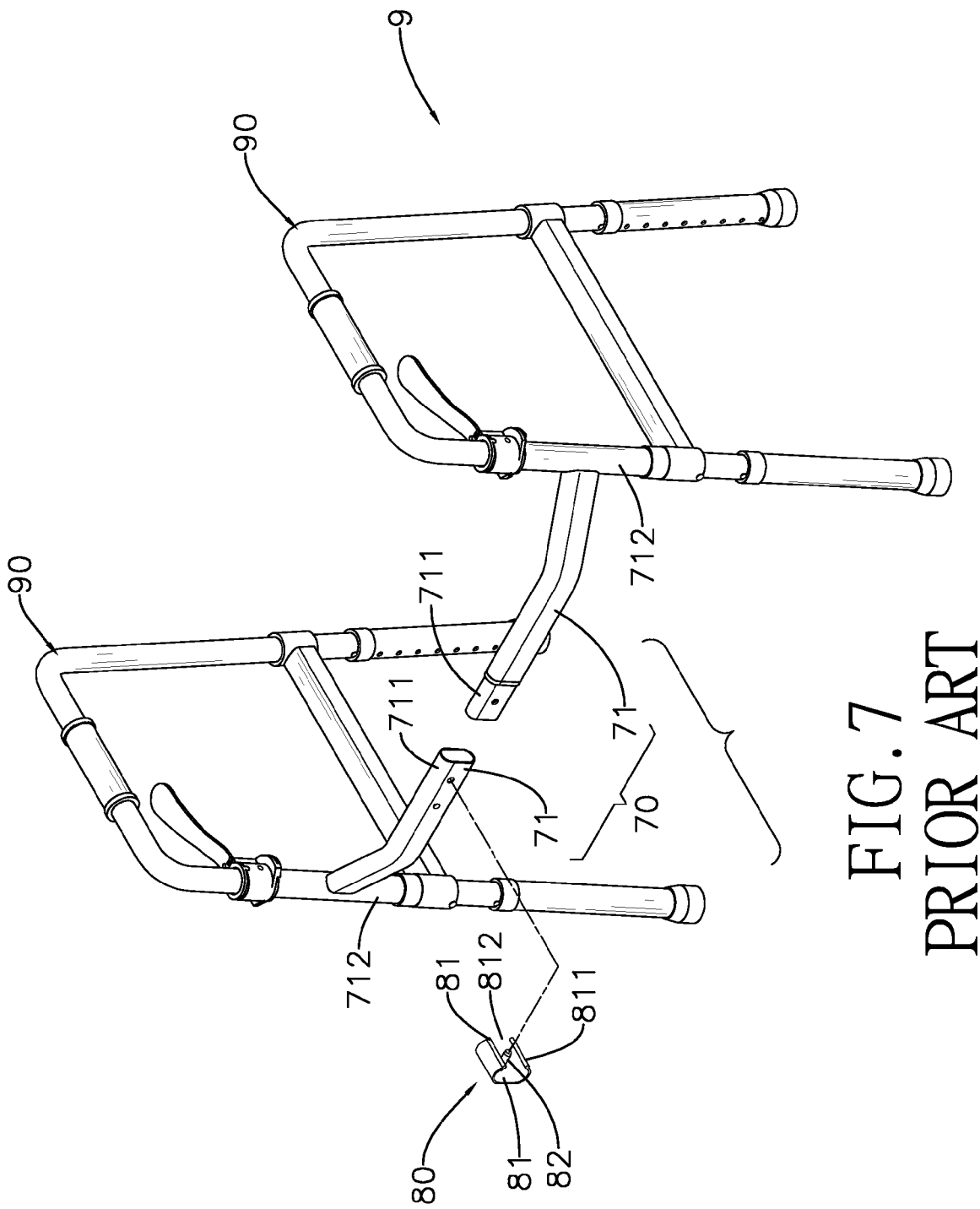
FIG. 7 is an exploded perspective view of a conventional walker.

With reference to FIG. 5 and FIG. 6, in order to fold up the walker 1 for storage, firstly, the fastening assembly 20 is removed from the connection part 10 and the two brace units 11A, 11B are separated from each other. Secondly, each side frame 30 is folded toward the brace unit 11A, 11B. Finally, the two side frames 30 are drawn close to each other to fold up the walker 1 for storage.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A fastening assembly comprising:
   a first baffle having a pivot end;
   a second baffle being parallel to the first baffle and having an external sidewall opposite to the first baffle and a clasping portion formed on the external sidewall;
   a curved wall comprising
      an internal face;
      two ends respectively connecting to the first baffle and the second baffle; and
      at least one plug formed on the internal face and located between the first baffle and the second baffle, the at least one plug being parallel to the first baffle and the second baffle; and
   a clasping component pivotally connecting to the pivot end of the first baffle and including a clasping structure selectively engaging with the clasping portion of the second baffle;
   wherein a distance between the first baffle and the second baffle is smaller than a width of the first baffle or a width of the second baffle.

2. The fastening assembly as claimed in claim 1, wherein the clasping portion of the second baffle is a bump; and the clasping structure of the clasping component is a hook.

3. A walker comprising:
   a connection part comprising two brace units, each brace unit including
      a joint portion, the joint portions of the two brace units selectively attached to each other; and
      a mounting portion having an upper end and a lower end;
      the fastening assembly as claimed in claim 1 longitudinally inserted into the joint portions of the two brace units, whereby the two brace units are attached to each other selectively; and
   two side frames respectively mounted to the mounting portions of the two brace units.

4. The walker as claimed in claim 3, wherein one of the joint portions of the two brace units is mounted on the other joint portion; the at least one plug of the fastening assembly is longitudinally inserted into both the joint portions of the two brace units; the curved wall of the fastening assembly is attached to a top surface of said one of the joint portions; the clasping component is selectively attached to a bottom surface of said one of the joint portions; and the clasping structure of the clasping component selectively engaging with the clasping portion of the second baffle.

5. The walker as claimed in claim 3, wherein each side frame comprises
   a front leg pivotally mounted to the lower end of the mounting portions of a corresponding one of the two brace units;
   a back leg disposed opposite to the front leg and having a top end;
   a connecting member joined to the front leg and the back leg; and
   a U-shaped frame having
      a front end pivotally mounted to the upper end of the mounting portions of said corresponding one of the two brace units; and
      a back end mounted to the top end of the back leg.

6. The walker as claimed in claim 4, wherein each side frame comprises
   a front leg pivotally mounted to the lower end of the mounting portions of a corresponding one of the two brace units;
   a back leg disposed opposite to the front leg and having a top end;
   a connecting member joined to the front leg and the back leg; and
   a U-shaped frame having
      a front end pivotally mounted to the upper end of the mounting portions of said corresponding one of the two braces units; and
      a back end mounted to the top end of the back leg.

* * * * *